United States Patent
Harris

(10) Patent No.: US 10,268,356 B2
(45) Date of Patent: Apr. 23, 2019

(54) MOVING LIGHTS FORMING PIXELS OF A VIDEO

(71) Applicant: Production Resource Group LLC, New Windsor, NY (US)

(72) Inventor: Jeremiah J Harris, New Windsor, NY (US)

(73) Assignee: Production Resource Group, LLC, New Windsor, NY (US)

( * ) Notice: Subject to any disclaimer, the term of this patent is extended or adjusted under 35 U.S.C. 154(b) by 405 days.

(21) Appl. No.: 15/088,422

(22) Filed: Apr. 1, 2016

(65) Prior Publication Data

US 2016/0283100 A1    Sep. 29, 2016

Related U.S. Application Data

(62) Division of application No. 12/613,736, filed on Nov. 6, 2009.

(60) Provisional application No. 61/112,133, filed on Nov. 6, 2008.

(51) Int. Cl.
| | |
|---|---|
| G06F 3/0484 | (2013.01) |
| G06F 3/0486 | (2013.01) |
| G06F 3/14 | (2006.01) |
| G09G 3/00 | (2006.01) |
| G09G 3/02 | (2006.01) |
| H05B 37/02 | (2006.01) |
| G11B 27/028 | (2006.01) |
| G11B 27/10 | (2006.01) |
| H04N 9/31 | (2006.01) |

(52) U.S. Cl.
CPC ........ *G06F 3/04847* (2013.01); *G06F 3/0486* (2013.01); *G09G 3/001* (2013.01); *G09G 3/02* (2013.01); *G11B 27/028* (2013.01); *G11B 27/102* (2013.01); *H04N 9/3164* (2013.01); *H05B 37/029* (2013.01); *G06F 3/1423* (2013.01); *G06F 3/1446* (2013.01)

(58) Field of Classification Search
CPC . G06F 3/0486; G06F 3/04847; H05B 37/029; G09G 3/001
See application file for complete search history.

(56) References Cited

U.S. PATENT DOCUMENTS

| | | | | |
|---|---|---|---|---|
| 2003/0210213 | A1* | 11/2003 | Wu | H04N 9/315 345/82 |
| 2004/0001079 | A1* | 1/2004 | Zhao | G11B 27/034 715/719 |
| 2008/0291664 | A1* | 11/2008 | Pesenti | G02B 6/0096 362/153.1 |

* cited by examiner

*Primary Examiner* — Li P Sun

(74) *Attorney, Agent, or Firm* — Law Office of Scott C Harris, Inc

(57) ABSTRACT

A video is divided into portions, and the portions are used to control moving lights. A video is displayed where each moving light becomes a superpixel of the eventual displayed video. The superpixels themselves may be formed of pixels.

7 Claims, 2 Drawing Sheets

MOVING LIGHTS FORMING PIXELS OF A VIDEO

This is a divisional of Ser. No. 12/613,736, filed Nov. 6, 2009, which claims priority from application Ser. No. 61/112,133, filed Nov. 6, 2008, the entirety of both of which are herewith incorporated by reference.

BACKGROUND

Stage lights can illuminate an area based on a remote control of the light output. A conventional stage lighting console controls these lights using a format such as DMX 512, or some other comparable format that allows each of the lights to be controlled individually according to a cue. The cue, for example, can be a series of commands to be executed by the light. A conventional show is made by taking different lights, and defining cues for those lights.

LED lights, such as an LED walls and lights formed of multiple different LEDs are also known. In addition, a digital light, which has the ability to control a single beam of light on a pixel by pixel basis is itself known. Digital lights can produce pixel-mapped outputs.

SUMMARY

The present application describes a system that takes plural moving lights, and controls each of the moving lights to act as a single portion of an overall effect. A video can be played using the moving lights, wherein each light in the array of lights forms one portion, e.g., a "superpixel" of the video.

Another aspect describes controlling individual moving lights as though they were pixels of the video.

DETAILED DESCRIPTION

Figure 1:
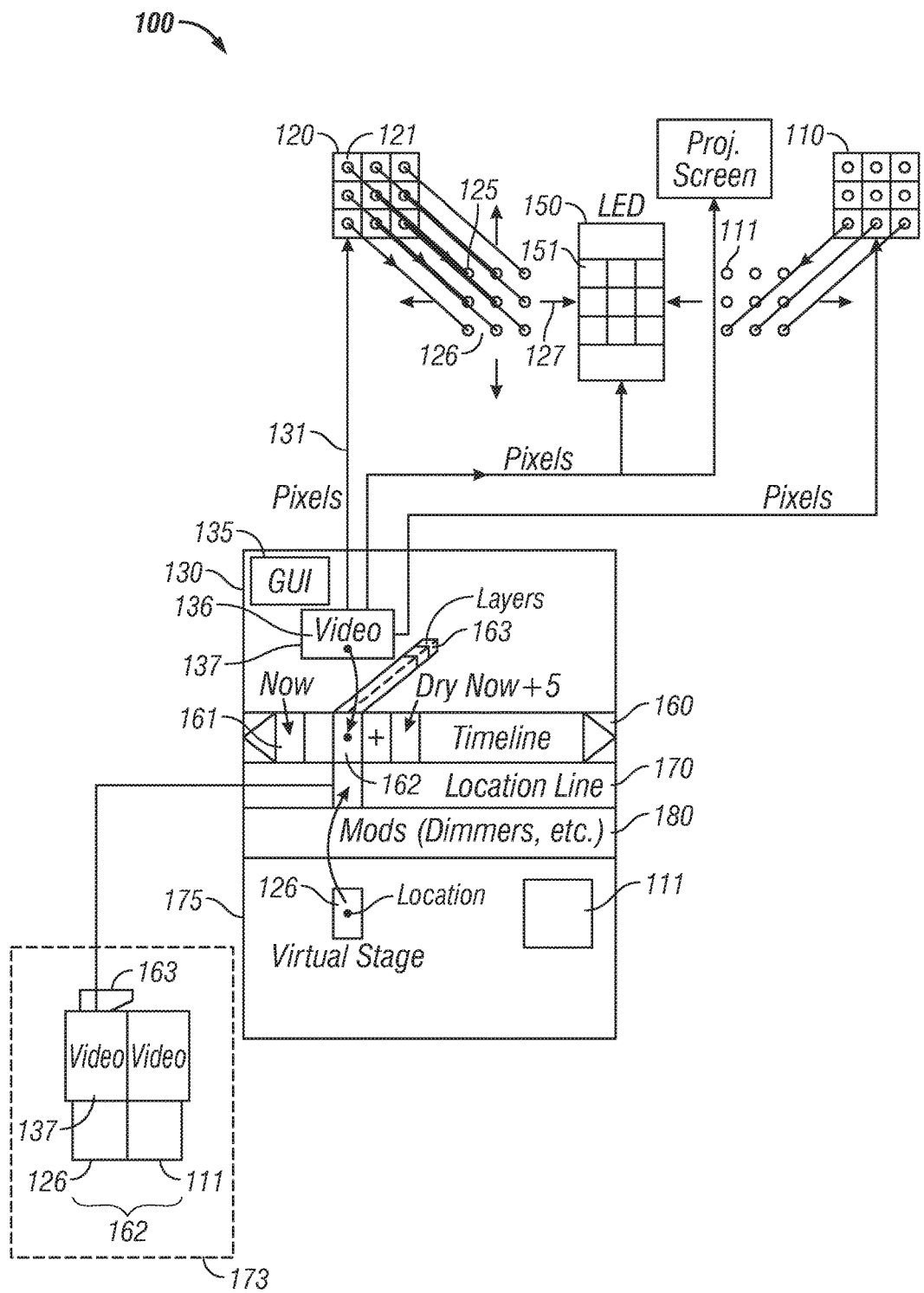
FIG. 1 shows an embodiment.

An embodiment is shown in FIG. 1 with groups of lights. Each of these lights is mapped to a portion of the video, so that the output of each light becomes a portion of the video, referred to herein as being a pixel of the video, even though the pixel might itself be formed of many different items of information. A pixel which itself is made up of many different pixels is referred to herein as a superpixel.

Figure 2:
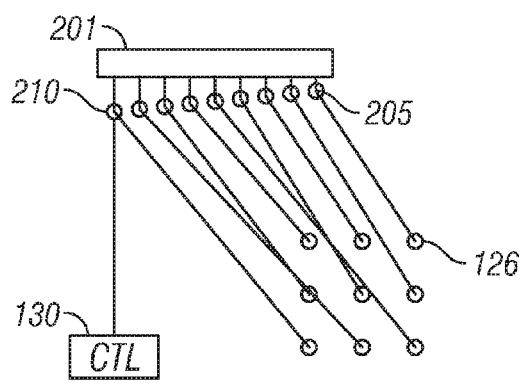
FIG. 2 shows another embodiment with all lights in a linear row.

FIG. 1 shows a stage environment 100, defining an area to be illuminated by the stage lights. A first group of lights 110 is located at stage left, and a second group of lights at 120 is located at stage right. In this embodiment, the lights are shown in a two-dimensional array. However, the lights can alternatively be linearly located as shown in FIG. 2. Since the pan and tilt positions of the lights can be changed to point the lights in different directions, any shaped group of lights can be directed into a desired rectangular shape of projection. For example, lights can be located linearly along a linear truss, but still form a two dimensional display.

Each of the lights within the array 120 such as 121 is individually controllable, both the amount and color of light that it projects, and also for its direction. In the embodiment, these lights are pan and tilt controllable lights, which can hence be panned and tilted in any of a number of different directions. The embodiment of FIG. 1 shows only nine lights forming a 3×3 array, but it should be understood that any number of lights can be in this array. For example, the embodiment contemplates a 4×4 array, 5×5 array, 6×6, 7×7, 8×8, 9×9, 10×10, or more generally, an n×n array, where n can be any number between 2 and 2000, for example.

A 10×10 array might provide, for example, 100 pixels to display the video. In the embodiment, control is carried out from a remotely located console 130 which produces output signals that control the different lights. The console 130 may produce only a single output, with DMX 512 operating to time division multiplex the signals. For clarity, FIG. 1 shows three separate outputs, but it should be understood that there can be just as easily one separate output.

The console 130 may include a video selector formed of a graphical user interface 135 that allows selecting the video, here 136. The video can be of any shape or size. In this embodiment, the video is pixel mapped to a 10×10 light or 10×8 array, and the pixel mapped video is then mapped to the array 120 of lights. Each pixel in the video is mapped to a moving light, and hence becomes a single pixel on the stage. Hence, pixel 137 is mapped to light 121 and shown as light spot 125 on the stage. The same video may also be or some other video may also be mapped to array 110. The video may be mapped to the array in exactly the same way as 120, or in a reverse way for example.

150 shows an LED wall, which is also formed of a number of pixels such as 151, each of which is formed by a single LED or group of LEDs for example. Video 136 can also map to the pixel 150.

For example, this allows each of the different devices, movable stage lights, LEDs, and/or projection screens 160 to be mapped using the same video source.

In an embodiment, the lights 121 are movable in pan and tilt directions. This allows the light cluster shown generally as 126 to be moved in any of the directions for example shown by the arrows. The lights can be moved further apart to expand the size of the video, closer together, or can be moved within the stage. In one embodiment, the lights 126 are move to the right in the direction of the arrow 127, until they reach the LED device 150. At that point, the LED device may be driven by the same pixels of the same video, so that the same effect is maintained, using a different device. For example, the matrix of lights 110 may begin projecting as the device moves across the stage. Other devices can be controlled in the same way. In this way, this allows wiping across the stage using the video source to drive the source of the wiping of the video across the stage.

One of the advantages of this system is based on the realization that right now there is one way of communicating with pixel mapped devices such as LEDs, and another way of communicating with moving lights. In order to make the LEDs red, you send them a video of all red pixels. However, in order to make the light show red, you can send each light a cue or other information telling it to be red. This technique allows driving a group of lights as though that group were pixels, in precisely the same way that the lights are driven for pixel devices such as LEDs.

Another aspect describes a way of using movable stage lights for playing video. Since a video can be played using the stage lights, the video can be moved around on the stage in a different way than in the prior art. Moreover, since each of the lights are movable, the video can not only be moved in pan and tilt directions, but also can be rotated by moving the pointing location of the lights.

For example, the video pixels can be rotated in the plane of the paper as shown in FIG. 1. One advantage is that this enables assembling a color motion pattern through video that would take a very long time to carry out on a console using cues. The motion playback is fluid rather than chunks of command as which would be given in a series of cues.

The "superpixels" shown by the lights can themselves have many items of information. For example, each stage light that is displaying the video may itself be a digital light, capable of displaying a video of 640×480 pixels. In this case, each "pixel" displayed by each stage light is itself a superpixel, formed of many subpixels. In this case, a 10×10 array could display 100 superpixels, each of 640×480 pixels.

In the case where the source video has less resolution than that which could be displayed by the 100 superpixels, the resolution displayed by the superpixels can be adjusted, e.g., each individual pixel of each displaying lamp can be set to display multiple different pixels.

The arrays can be non-square, for example, in order to accommodate the usual 1: 1⅓ aspect ratio.

Another embodiment may use conventional lights to display each pixel of a video in significantly reduced resolution. This may rely on downsampling of the pixel video; for example downsampling of 50:1. A 640×480 video might be downsampled to 10×8, with each downsampled pixel representing approximately 48×48 neighborhood of old pixels.

The downsampling can use averaging of multiple pixels and replacing the pixel by its average; or replacing the pixel by its median, or any other technique, both for color and for brightness of the downsampled pixel.

Another aspect relates to a very specific new way of forming a console that does not require cues to carry out the operation. FIG. 1 shows this console. According to the system in FIG. 1, there is a graphical user interface 135 that allows selecting of media, here video to be played. The console also includes a timeline 160, which may start at time 0, or may you more generally start at the time "now" 161. The video or other media can be dragged onto the timeline at a specific time, causing the console to then command that video be played at the specific time set in the timeline. Moreover, at the specific time such as time 162, there may be a number of different items which are substantially simultaneously placed into the cue. FIG. 1 shows the video 136 being placed into the cue. However, there are also other layers at 162, including layers shown such as 163.

Another item can be placed in a different layer of the timeline, to be displayed at the same time as the timeline. For example, a layer may be a see-through layer, a blurring layer, or the like.

170 represents a location line, and a virtual stage is shown as 175. Different areas on that stage, for example the area 126, are shown. The operator can select that area 126, and drag it into the location line adjacent the video and 137 and other items which have been placed into section 162. This produces, for example, a format where the video 137 is associated with the location 126 as shown in the blowup section 173.

In addition, another area such as 111 can also be placed in the same area with the same or a different video. Each of these collectively represents a specific time slot here shown as 162. Any number of these timeslots may be provided.

In addition, there can be another layer shown generally as 163 which is also at the spot 126. By displaying a video at location 126, all of the lights of the array 120 are automatically assigned to the video, and caused to display the video as shown.

Another layer shown as 180 is a modification layer, and may be used for dimmers, colors, or other modifications to the other information previously stated.

The above has shown the lights being arranged in a two-dimensional array 120. However, the lights can also be linearly arranged and still controlled via pan and tilt controls to display their output into a two-dimensional display. FIG. 2 shows a truss 201 which is the conventional linear truss with a number of lamps 210 thereon being linearly arranged. The lights are controlled by the controller 130 according to their specific locations, in order to make the linearly-arranged lights appear in a two-dimensional array 126 as shown. In fact, the displaying lamps 210 can be located in any location, on opposite sides of the stage or anywhere, and can be controlled with other lamps to form the superpixels of the projection.

As in the other embodiments, the positions of the lights within the array 126 can be controlled. In this embodiment, each lamp is controlled according to its position and the position in the pixel. For example, light 205 may be projected to pixel position 206.

Figure 3:
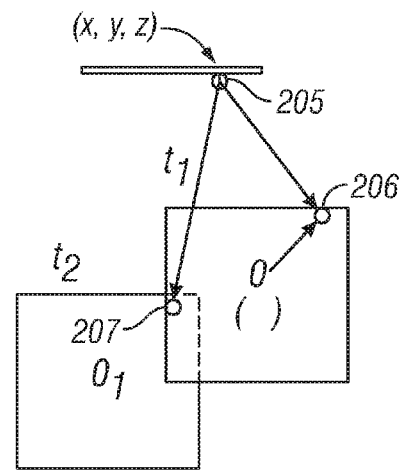
FIG. 3 shows control of the lights.

Light 205 is at a known position x,y,z. The location of the video may have an origin shown as zero in FIG. 3, and the position of the lamp 206 is at a specified location relative to that origin. According to an embodiment, a transformation is carried out which compares; and which determines the pan and tilt position of the light based on its known location x,y,z, and based on the position of the origin zero, and the position of the pixel 206 relative to the origin zero. At time t2, the pixel will have moved to a new origin shown as O1, and the light thereafter is moved to area 2 the position of the pixel at 207.

A geometric transformation between the known point in space of the light 205, and the pixels, can therefore be carried out in this way.

Figure 4:
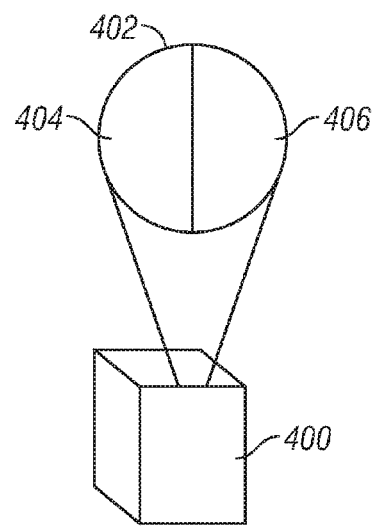
FIG. 4 shows using a light as multiple pixels.

In the above, digital lights form superpixels of the displayed video. Analog lights form single-pixel-per lamp pixels of the displayed video. Another embodiment may allow each of the analog lights to take the place of multiple pixels in a video unit. For example, certain lights such as the Icon™, allow projecting a split beam, where there is a split between two different colors. The beam can form a pixel with two different colors as shown in FIG. 4 where the light 400 produces a beam 402 which has one pixel 404 on the left and another pixel 406 on the right. In similar ways, the light beam can be divided into four or more pieces, so that each light beam represents 4 pixels. The breakup of the light beam into multiple parts can use a digital light, for example, which can use any kind of spatial light modulator.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other lights and controls can be used. While the above describes pixels of a video, it should be understood that this system can represent pixels of a still image.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A method, comprising:
at a first time, using a computer for forming a user interface having a timeline representing times including multiple different future times;
using the computer for placing items to be displayed, on said timeline, with said items being placed on the timeline to be displayed at multiple times corresponding to the multiple different future times;
using the computer for automatically determining a current time, and automatically determining items which have been placed on the timeline to be displayed at a time corresponding to the current time, and automatically causing at least one remotely controllable light to display the items on the timeline to be displayed at the current time based on said current time matching the time at which said items are on the timeline,
wherein the user interface displays a graphical interface indicative of a stage to be illuminated by the at least one remotely controllable light, and enables selecting, from said graphical interface, an area on the stage to be illuminated by the at least one remotely controllable light and placing said selected area on the stage on the timeline in one of said times to illuminate that area at that time.

2. The method as in claim 1, wherein said placing items comprises placing items on the timeline to be displayed by multiple different lamps, where each of the multiple lamps corresponds to a pixel of the item being displayed.

3. The method as in claim 2, wherein said placing comprises placing different items into different layers on the timeline at each of plural different times, where at least one time has multiple different layers that are simultaneously displayed at said one time.

4. The method as in claim 3, wherein one layer modifies the video on another layer.

5. The method as in claim 4, wherein said modifies comprises changing an aspect of display of a video.

6. The method as in claim 2, wherein the multiple lamps are in an array, and are operated to represent the pixels.

7. The method as in claim 1, wherein the items are placed in the timeline at multiple times subsequent to the first time.

* * * * *